(12) United States Patent
Yang et al.

(10) Patent No.: US 10,902,313 B2
(45) Date of Patent: Jan. 26, 2021

(54) SYSTEM AND METHOD FOR DETERMINING AN ARTIFICIAL INTELLIGENCE MODEL IN A DECENTRALIZED NETWORK

(71) Applicant: GYRFALCON TECHNOLOGY INC., Milpitas, CA (US)

(72) Inventors: Lin Yang, Milpitas, CA (US); Charles Jin Young, Milpitas, CA (US); Jason Zeng Dong, San Jose, CA (US); Patrick Zeng Dong, San Jose, CA (US); Baohua Sun, Fremont, CA (US); Yequn Zhang, San Jose, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 536 days.

(21) Appl. No.: 15/950,109

(22) Filed: Apr. 10, 2018

(65) Prior Publication Data
US 2019/0311247 A1    Oct. 10, 2019

(51) Int. Cl.
*G06N 3/04*    (2006.01)
*G06N 3/063*    (2006.01)

(52) U.S. Cl.
CPC .............. *G06N 3/0454* (2013.01); *G06N 3/04* (2013.01); *G06N 3/063* (2013.01)

(58) Field of Classification Search
CPC ......... G06N 3/0453; G06N 3/04; G06N 3/063
USPC ........................................................ 706/10
See application file for complete search history.

(56) References Cited

U.S. PATENT DOCUMENTS

2017/0103167 A1*    4/2017    Shah ...................... G16H 10/60

OTHER PUBLICATIONS

Transform Blockchain into Distributed Parallel Computing Architecture for Precision Medicine (Year-2018).*
Crypto_Nets: Neural Network Over Encrypted Data (Year:2014).*
U.S. Appl. No. 15/950,104 titled 'System and Method for Determining an Artificial Intelligence Model in a Decentralized Network' filed on Apr. 10, 2018.

* cited by examiner

*Primary Examiner* — Ann J Lo
*Assistant Examiner* — Em N Trieu
(74) *Attorney, Agent, or Firm* — Dorsey & Whitney LLP (57) ABSTRACT

A system may include a decentralized communication network and multiple processing devices on the network. Each processing device may have an artificial intelligence (AI) chip, the device may be configured to generate an AI model, determine the performance value of the AI model on the AI chip, receive a chain from the network where the chain contains a performance measure. If the performance value of the AI model is better than the performance measure, then the processing device may broadcast the AI model to the network for verification. If the AI model is verified by the network, the device may update the chain with the performance value so that the chain can be shared by the multiple processing devices on the network. Any processing device on the network may also verify an AI model broadcasted by any other device. Methods for generating the AI model are also provided.

20 Claims, 6 Drawing Sheets

SYSTEM AND METHOD FOR DETERMINING AN ARTIFICIAL INTELLIGENCE MODEL IN A DECENTRALIZED NETWORK

FIELD

This patent document relates generally to systems and methods for providing artificial intelligence solutions and in particular to determining an artificial intelligence model for loading into an artificial intelligence chip in a decentralized network.

BACKGROUND

Artificial intelligence solutions are emerging with the advancement of computing platforms and integrated circuit solutions. For example, an artificial intelligence (AI) integrated circuit (IC) may include a processor capable of performing AI tasks in embedded hardware. Hardware-based solutions, as well as software solutions, still encounter the challenges of obtaining an optimal AI model, such as a convolutional neural network (CNN). A CNN may include multiple convolutional layers, each of which may include multiple weights. Given the increasing size of the CNN that can be embedded in an IC, a CNN may include hundreds of layers and may include tens of thousands of weights. For example, the size of the weights for an embedded CNN inside an AI chip may be as large as a few megabytes. This makes it difficult to obtain an optimal CNN model because large amount of computing times are needed.

This patent disclosure is directed to systems and methods for addressing the above issues and/or other issues.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Unless defined otherwise, all technical and scientific terms used in this document have the same meanings as commonly understood by one of ordinary skill in the art.

Each of the terms "artificial intelligence logic circuit" and "AI logic circuit" refers to a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Each of the terms "integrated circuit," "semiconductor chip," "chip" and "semiconductor device" refers to an integrated circuit (IC) that contains electronic circuits on semiconductor materials, such as silicon, for performing certain functions. For example, an integrated circuit can be a microprocessor, a memory, a programmable array logic (PAL) device, an application-specific integrated circuit (ASIC) or others. An integrated circuit that contains an AI logic circuit is referred to as an AI integrated circuit.

The term "AI chip" refers to a hardware- or software-based device that is capable of performing functions of an AI logic circuit. An AI chip can be a physical IC or can be a virtual chip, i.e., software-based. For example, a virtual AI chip may include one or more process simulators to simulate the operations of a physical AI IC.

The term of "AI model" refers to data that include one or more weights that are used for, when loaded inside an AI chip, executing the AI chip. For example, an AI model for a given CNN may include the weights for one or more convolutional layers of the CNN.

Figure 1:
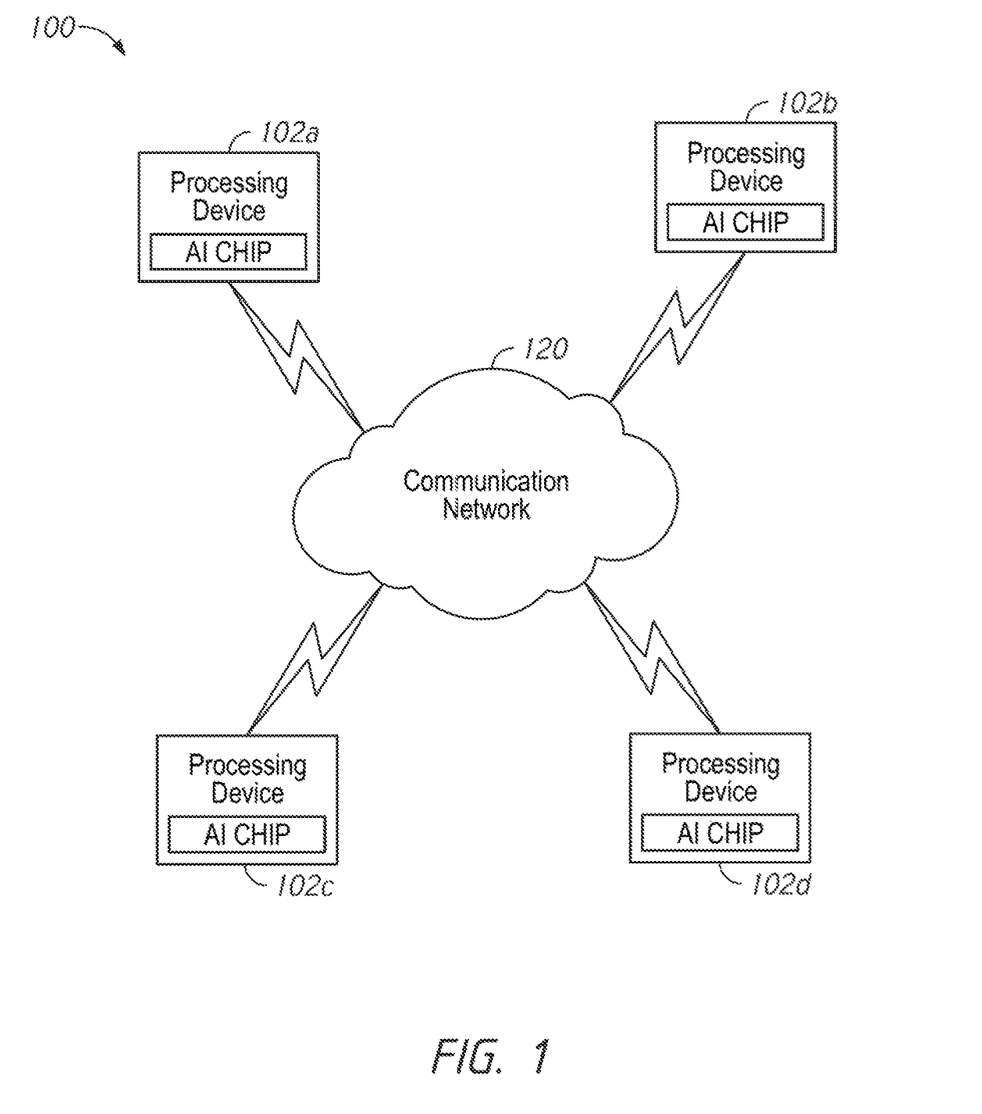
FIG. 1 illustrates an example system in accordance with various examples described herein.

With reference to FIG. 1, a decentralized network system 100 includes one or more processing devices 102a-102d, each processing device having one or more AI chips. The AI chip may be a physical AI integrated circuit. The AI chip may also be software-based, i.e., a virtual AI chip that includes one or more process simulators to simulate the operations of a physical AI IC. A processing device may be coupled to an AI IC and contain programming instructions that will cause the AI IC to be executed on the processing device. Alternatively, and/or additionally, the a processing device may also have a virtual AI chip installed and the processing device may contain programming instructions configured to control the virtual AI chip so that the virtual AI chip may perform certain AI functions. In FIG. 1, each processing device 102a-102d in system 100 may be in electrical communication with other processing devices via a communication network 120. Communication network 120 may include any suitable communication links, such as wired (e.g., serial, parallel, optical, or Ethernet connections) or wireless (e.g., Wi-Fi, Bluetooth, mesh network connections). In some scenarios, the processing devices 102a-102d may communicate with each other via a peer-to-peer (P2P) network.

In some scenarios, the AI chip may contain an AI model for performing certain AI tasks. For example, an AI model may be a convolutional neural network (CNN) that is trained to perform voice or image recognition tasks. A CNN may include multiple convolutional layers, each of which may include multiple weights. In the case of physical AI chip, the AI chip may include an embedded cellular neural network that has a memory for containing the multiple weights in the CNN. In some scenarios, the memory in a physical AI chip may be a one-time-programmable (OTP) memory that allows a user to load a CNN model into the physical AI chip once. Alternatively, a physical AI chip may have a random access memory (RAM) or other types of memory that allows a user to load a CNN model into the physical AI chip multiple times.

In the case of virtual AI chip, the AI chip may include a data structure to simulate the cellular neural network in a physical AI chip. A virtual AI chip can be of particular advantageous when multiple tests need to be run over various CNNs in order to determine a model that produces the best performance (e.g., highest recognition rate or lowest error rate). In each test run, the weights in the CNN can easily vary and be loaded into the virtual AI chip without the cost associated with a physical AI chip. Only after the CNN model is determined will the CNN model be loaded into a physical AI chip for real-time applications. Training a CNN model may require significant amount of computing power, even with a physical AI chip because a CNN model may include tens of thousands of weights. For example, a modern physical AI chip may be capable of storing a few megabytes of weights inside the chip. In some scenarios, a CNN model can be obtained by multiple processing devices in a decentralized network system as implemented in FIG. 1. Details are further described with reference to FIGS. 2-5.

Figure 2:
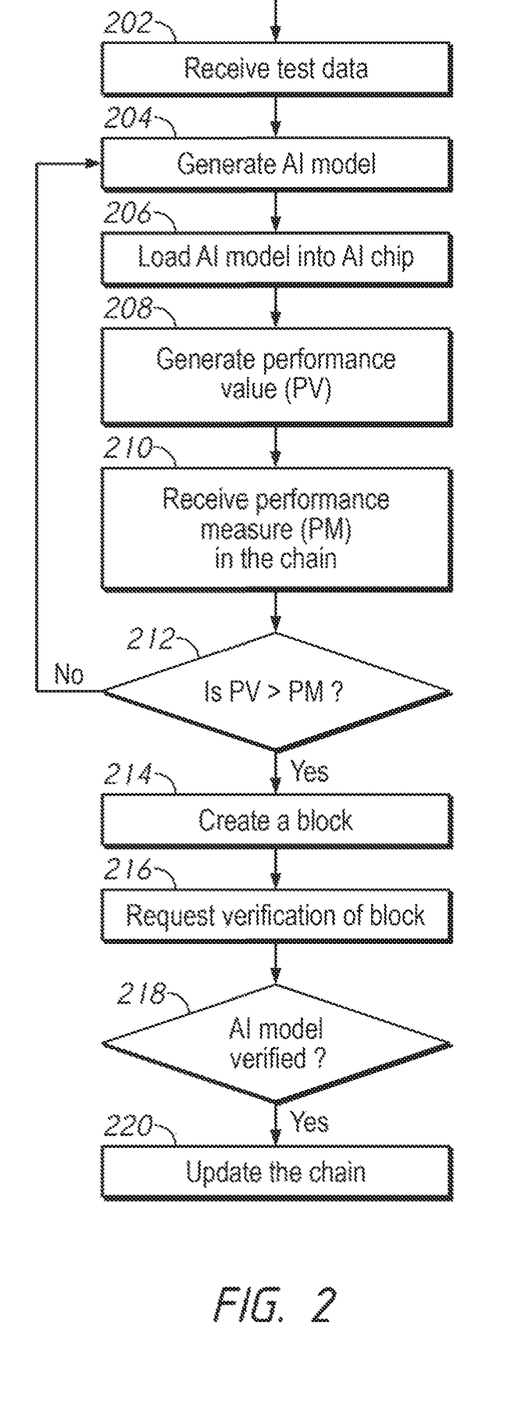
FIG. 2 illustrates a diagram of an example process for updating a chain with a new AI model in accordance with various examples described herein.

In FIG. 2, a processing device in the decentralized network system as shown in FIG. 1 (e.g., 102a) may have programming instructions that, when executed, will cause the processing device to access a dataset 202, for example, test data. The test data may be provided for use in obtaining the AI model. In doing so, the AI model may be specific to the test data. For example, test data may be used for training an AI model for suitable for face recognition tasks, and can be any suitable data set collected for performing face recognition tasks. In another example, test data may be used for training an AI model suitable for scene recognition in video and images, and can be any suitable scene data set collected for performing scene recognition tasks. In some scenarios, test data may be residing in a memory in each of the processing devices in the decentralized system. In other scenarios, test data may be residing in a central data repository and is available for access by any of the processing devices (e.g., 102a-102d in FIG. 1) via the communication network 120.

With further reference to FIG. 2, the processing device may further be configured to: generate an AI model 204; load the AI model into the AI chip in the processing device 206; and generate a performance value 208 from the AI chip based on the test data. There may be various ways of generating the AI model, as will be described in detail later in this document. Once an AI model is generated, it may or may not be the best AI model. In other words, for given test data, one AI model may yield higher performance than another AI model does. A higher performance may refer to a higher recognition rate or a lower error (or loss) rate. In some scenarios, the processing device may be configured to mine the best (or better) AI model that may result in the best (or better) performance.

In generating an optimal AI model, the processing device may run the test over the AI chip multiple times, using a different AI model each time. Once an AI model is generated, the processing device may load the AI model into the AI chip 206. For example, the AI model may be, or have been converted to a fixed point model suitable for loading into the AI chip. In some scenarios, a CNN model inside an AI chip may include large amount of data, e.g., over five megabytes, each byte representing a weight of a fixed point model. Loading the AI model into the AI chip may include transferring over five megabytes of data into the AI chip. Once the AI model is loaded into the AI chip, the processing device may execute the AI model in the AI chip based on the test data, and generate a recognition result, e.g., voice recognition, face recognition, or scene recognition results. Using the test data, the processing device may compare the recognition result with pre-labeled result and determine a performance value 208. For example, the performance value may be a recognition rate of voice recognition from running the test data over the AI model in the AI chip, wherein the recognition rate indicates the percentage of correct recognition result. As previously described, the AI chip may be a physical AI integrated circuit, or a software-based virtual AI chip. In another example, the performance value may also be an error rate indicating the percentage of errors in the recognition result.

With further reference to FIG. 2, the processing device may receive a performance measure in a chain 210 from the communication network. In some scenarios, a chain may be a ledger that is residing on the network and shared among all of the processing devices on the network. Thus, the performance measure that is contained in the chain may represent the best performance measure among all AI models across the network. A chain may include multiple data blocks, each block may be added by any of the devices on the network using a one-way hashing, which will make the chain resistant to tampering. Any suitable encryption or security schemes may be used for securely communicating the chain on the network.

In some scenarios, the processing device may compare the performance value from a test run with the performance measure received in a chain 212. If the performance value has exceeded the performance measure, the processing device may create a block 214 that includes the current AI model and the performance value. The processing device may request verification of the block 216 from the network. For example, the processing device may broadcast the verification request to the communication network, for example, in a P2P fashion, to verify the block. If the performance value has not exceeded the performance measure, the processing device may continue generating additional AI models 204, and repeat blocks 204-212. Subsequent to block 216, verification of the AI model may be done on the network by multiple process devices verifying the AI model, as will be further explained with reference to FIG. 3.

Figure 3:
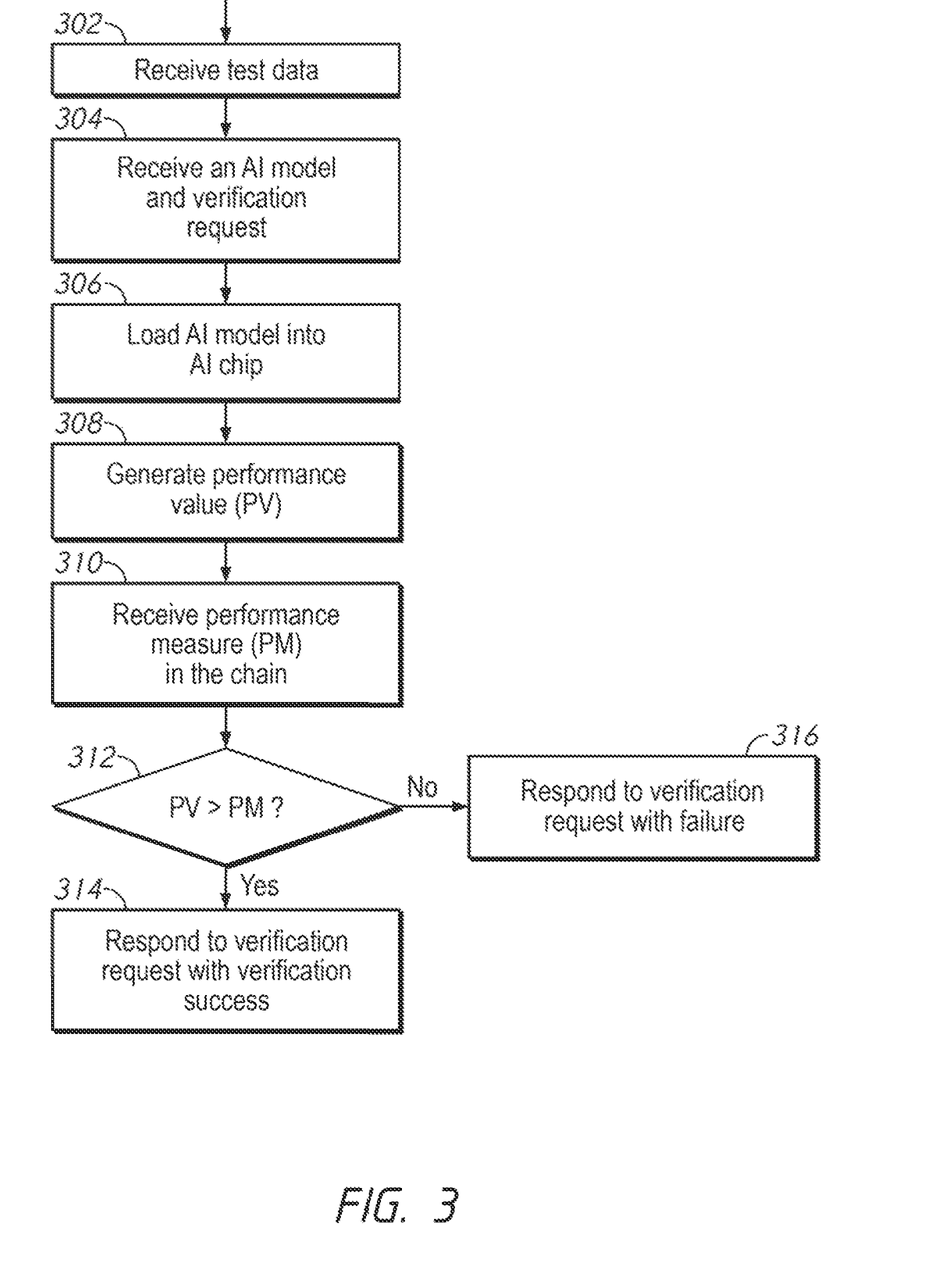
FIG. 3 illustrates a diagram of an example process for verifying an AI model that is implemented in a process device in accordance with various examples described herein.

In FIG. 3, any processing device, e.g., a second processing device on the network may receive test data 302, and also receive an AI model and verification request 304, where the AI model and the verification request may be transmitted by any other processing device in a manner as described with reference to FIG. 2. The second processing device may respond to the verification request by loading the AI model into the AI chip 306, where the AI chip is residing in the second processing device. The second processing device may also generate a performance value 308 on the AI model using the test data, receive the performance measure in the chain 310 on the network, and compare the performance value with the performance measure 312. If the performance value has exceeded the performance measure, the second processing device may determine that the AI model is verified. The second processing device may respond to the verification request with a verification success 314. If the performance value has not exceeded the performance measure, the second processing device may respond to the verification request with a failure 316. In the decentralized network, the response to verification request may be received by any device on the P2P network.

Multiple verification requests may exist on the network as one or more processing devices may be simultaneously generating new AI models and broadcasting them to the network for verification. Alternatively, and/or additionally, in some scenarios, a processing device, such as the second processing device, may receive the AI model and the verification request at a time interval, e.g., at every 10 minutes, which will allow the system to compare the various verification requests on the network and only keep the AI model having the currently best performance value available for other processing devices to verify. For example, during one time interval, e.g., 10 minutes, if two AI models were broadcasted to the network for verification with the first model having a higher performance value than the second one. The system may keep the first AI model and remove the second AI model and associated verification request from the network. In the above example, when the second processing device starts receiving from the network at the end of the time interval, e.g., 10 minutes, the processing device will receive only the first AI model and associated verification request. The selection of the best performance value in a time interval may be performed by any processing device on the network, as in a P2P manner.

Figure 4:
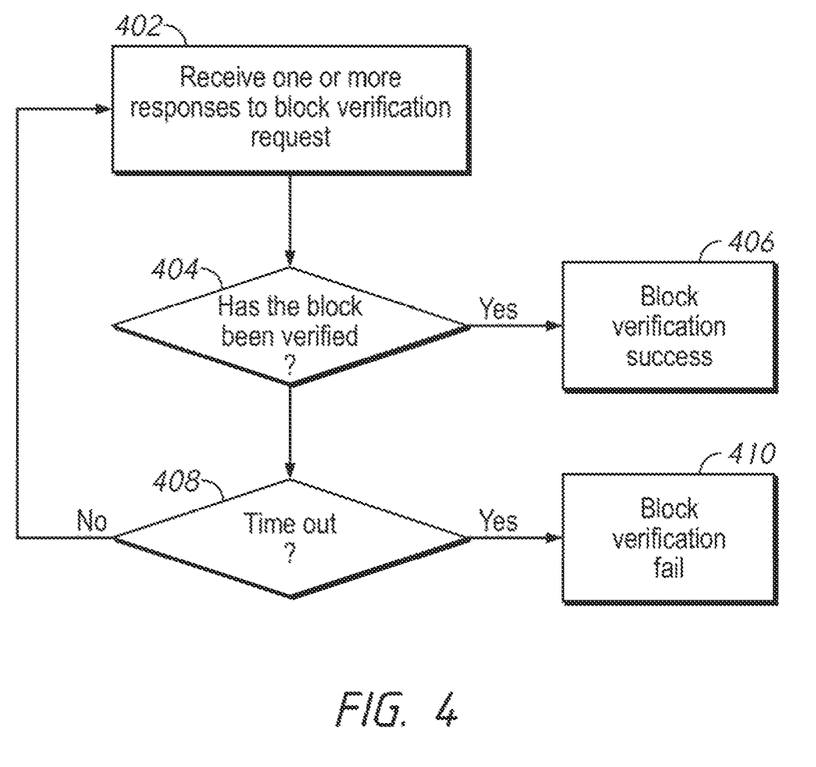
FIG. 4 illustrates a diagram of an example process for verifying a data block from multiple processing devices in a communication network in accordance with various examples described herein.

With reference to FIG. 4, in some scenarios, any processing device on the network may determine whether a verification of a block is successful by: receiving one or more responses to the block verification request 402; and determine whether the block has been verified by the network 404. For example, the processing device may determine whether over a percentage threshold of the total number of processing devices receiving the verification request has responded with a verification success. For example, the percentage threshold for successful verification may be 51% (majority rule), i.e. at least 51% of the total number of devices receiving the verification request has responded with success. Other percentage threshold values may also be used.

Next, the processing device may determine that the verification of the block is successful 406, if, for example, at least a percentage of the total number of processing devices receiving the verification request has responded with a verification success; otherwise, the processing device may repeat boxes 402 and 404. In some scenarios, the processing device may repeat boxes 402, 404 within a time out period 408. If time is out and the block has not been verified with the time out period, then the processing device may determine that the block verification fails 410. In some scenarios, a processing device that has generated a new AI model may itself implement the steps in FIG. 4 and determine whether a block that has been sent to the network for verification has been verified by the network. Alternatively, and/or additionally, any other device on the network may execute the steps in FIG. 4 and determine whether a new AI model that has been generated by another processing device has been verified by the network.

Returning to FIG. 2, the processing device that has generated the AI model to be verified by the network may be in communication with another device which has determined that the AI model has been verified by the network. Alternatively, the processing device may itself determine whether the AI model is verified 218, as described in FIG. 4. If the processing device determines that the AI model has been verified by the network, the processing device may update the chain based on the created block 220 so that the chain is available to one or more processing devices on the communication network. Alternatively, and/or additionally, the processing device may update the chain based on the performance value, while attaching the AI model to the chain so that both the chain and the attached AI model can be available to other devices on the network. In some scenarios, attaching an AI model to a chain may be done by including a pointer in the chain (e.g., a file name, a memory location, a network address etc.) that refers to the AI model. The AI model may be referenced by a file name, a memory location on a device, or a network address on the communication network.

Additionally, upon an AI model being verified, the processing device may receive an award. For example, the award may be an access right for the processing device to join or continue to stay in the network. The award may also be any other incentives. Alternatively, and/or additionally, the processing device may receive the reward only after a time period from when the new AI model was broadcasted to the network. For example, within a time period, e.g., 30 minutes, the system may check whether any other AI models having higher performance values have been broadcasted by other processing devices on the network. The processing device may receive the award if no chain that contains a higher performance value is received on the communication network within that time period.

There may be various ways of generating the AI model 204. For example, the processing device may be configured to train an AI model (e.g., a CNN model) based on the test data, as is available in existing systems. While existing systems train a CNN model that is targeted for executing on a server or a desktop computer, the CNN model usually includes weights that are of floating point. Here, when the final target device of an AI model is the physical AI integrated circuit, either a physical AI chip or a virtual AI chip may contain fixed points. Thus, in generating the AI model, the processing device may be configured to convert a floating point model to a fixed point model that is targeted for a physical AI logic circuit.

In some scenarios, the processing device may use an existing simulated annealing method, which is commonly used to approximate a global optimal value in a search space. As previously described, the processing device may also be configured to convert a floating point model that is obtained via simulated annealing method to a fixed point model that is targeted for a physical AI logic circuit. Other ways of generating the AT model may also be possible.

Alternatively, and/or additionally, the processing device may be configured to generate AI models independent of test data. In some scenarios, with reference to FIG. 5, a processing device may be configured to: (i) initialize an AI model 502; (ii) determine a string 504; (iii) use a hash encoder 508 to generate a hash code 506; and (iv) fill in the AI model with the hash code 510. In a non-limiting example, the processing device may determine a string that may be formed by a random number. The string may also attach a time stamp at the end, to form a unique random string. The processing device may feed this string into a hash encoder to generate a hash code. For example, the hash encoder may use one of a SHA1, SHA224, SHA256, SHA384, or SHA512 methods.

Figure 5:
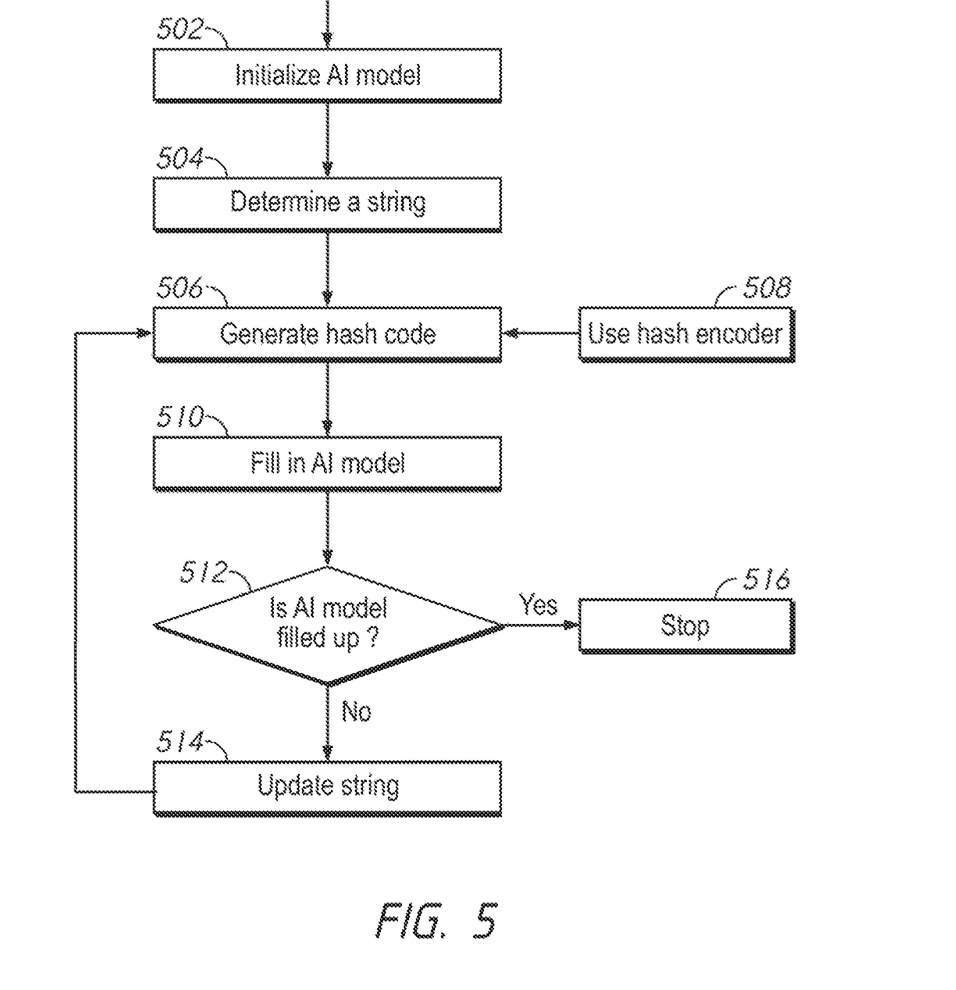
FIG. 5 illustrates a diagram of an example process for generating an AI model in accordance with examples described herein.

In a non-limiting example, using SHA256 may generate a hash code of 256 bits of binary data regardless of the length of the string. In filling the hash code to the AI model, the processing device may sequentially fill in the hash code. For example, a CNN model in a physical AI chip may have over 5 million filters, each having a weight, for example, in eight bits. This corresponds to over 5 million bytes of weights needed for generating the AI model. In some scenarios, each hash code (e.g., 256 bits) may be used to sequentially fill in the AI model. In the instant example, one hash code will fill in 32 weights in the AI model.

With continued reference to FIG. 5, the processing device may repeatedly generate the hash code 506, each time updating the input string to the hash encoder 514. In some scenarios, a hash code generated from a previous run may be used as the input to the hash encoder in the current run. For example, the hash code generated from the last step above may be used as the input to the hash encoder to generate a second hash code. In some scenarios, the updated hash code may also attach a random number to form a new string before being fed into the hash encoder. In the example above, each time a new hash code is generated, 32 additional weights in the AI model are filled. This process repeats while checking whether the AI model has been filled up 512. When the AI model is filled up, this process stops 516. The above examples in FIG. 5, when implemented in the processing device in FIG. 1, allow a device to continue mining for the best AI model. This mining process may start with a push of a button from the user or automatically at the boot of the device, and continues by itself.

As described above, multiple processing devices on the decentralized network may share the same ledger, such as a chain, that records a performance value. The chain may also record the verified AI model associated with the performance value. At the start of the system, an initial block may be used to start a chain. For example, a model may use an existing CNN architecture, such as Oxford Geometry Visual Group (VGG) convolutional neural network. Anytime a new AI model is generated by any of the processing devices on the network and subsequently verified by the network, the chain may be updated to add a new block that includes the new performance value associated with the new AI model. In some examples, the new AI model may also be included, in updating the chain. In other examples, the new AI model may be attached (instead of being hashed) to the chain, in which case, any AI model broadcasted on the network can be modified. For example, because ultimately only the best AI model is of interest, as more new verified AI models are generated, the network may detach (or remove) some old AI models and keep only more recent AI models, such as the last two or three verified AI models.

Figure 6:
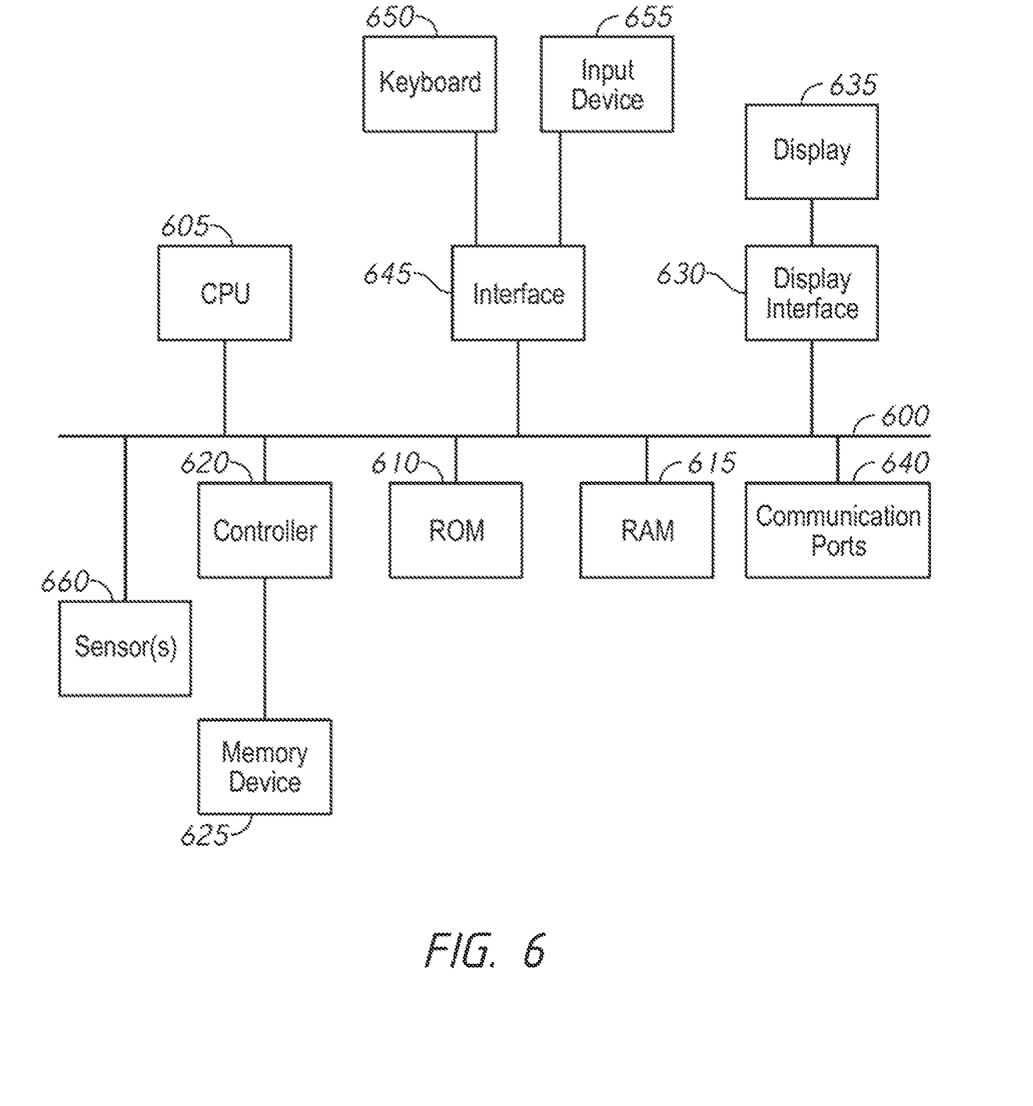
FIG. 6 illustrates various embodiments of one or more electronic devices for implementing the various methods and processes described herein.

FIG. 6 depicts an example of internal hardware that may be included in any electronic device or computing system for implementing various methods in the embodiments described in FIGS. 1-5. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM) 610, random access memory (RAM) 615, flash memory, hard drives and other devices capable of storing electronic data constitute examples of memory devices 625. A memory device, also referred to as a computer-readable medium, may include a single device or a collection of devices across which data and/or instructions are stored.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a transmitter and/or receiver, antenna, an RFID tag and/or short-range or near-field communication circuitry. A communication device 640 may be attached to a communications network, such as the Internet, a local area network or a cellular telephone data network.

The hardware may also include a user interface sensor 645 that allows for receipt of data from input devices 650 such as a keyboard, a mouse, a joystick, a touchscreen, a remote control, a pointing device, a video input device and/or an audio input device, such as a microphone. Digital image frames may also be received from an input device 655 such as an imaging capturing device (e.g., a video or camera) that can either be built-in or external to the system. Other environmental sensors 660, such as a GPS system and/or a temperature sensor, may be installed on system and communicatively accessible by the processor 605, either directly or via the communication ports 640. The communication ports 640 may also communicate with the AI chip to upload or retrieve data to/from the chip. For example, the best AI model may be included in the chain that is shared by all of the processing devices on the network. Any device on the network may receive the AI model from the network and upload the AI model, e.g., CNN weights, to the AI chip via the communication port 640 and an SDK (software development kit). The communication port 640 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a cellular neural network architecture may be residing in an electronic mobile device. The electronic mobile device may use the built-in AI chip to produce recognition results and generate performance values. In some scenarios, training for the convolutional neural network can be done in the mobile device itself, where the mobile device retrieves test data from a database and uses the built-in AI chip to perform the training. In other scenarios, the processing device may be a server device in the communication network (e.g., 120 in FIG. 1) or may be on the cloud. These are only examples of applications in which an AI task can be performed in the AI chip.

The various structures and methods disclosed in this patent document provide advantages over the prior art, whether standalone or combined. For example, using the decentralized network may help utilize resources on the network to achieve an optimal AI model that would not be feasible by a single computer. The above disclosed embodiments also allow different training methods to be adapted to generate AI models, whether test data dependent or test data independent. Above illustrated embodiments are described in the context of generating a convolutional neural network model for an AI chip (physical or virtual), but can also be applied to various other applications. For example, the current solution is not limited to implementing the CNN but can also be applied to other algorithms or architectures inside an AI chip.

It will be readily understood that the components of the present solution as generally described herein and illustrated in the appended figures could be arranged and designed in a wide variety of different configurations. Thus, the following more detailed description of various implementations, as represented in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent to those skilled in the art from the foregoing specification. Accordingly, it will be recognized by those skilled in the art that changes, modifications or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A system comprising:
    a first processing device coupled to a first artificial intelligence (AI) chip, the first processing device contains programming instructions that, when executed, will cause the first processing device to:
    (i) access a dataset;
    (ii) generate an artificial intelligence (AI) model;
    (iii) load the AI model into the first AI chip to generate a first performance value based on the dataset;
    (iv) receive a chain from a communication network, the chain comprising a performance measure;
    (v) determine whether the first performance value has exceeded the performance measure; and
    (vi) if the first performance value has exceeded the performance measure:
        create a block comprising the AI model and the first performance value;
        transmit the block and a verification request to the communication network to verify the block; and
        if verification of the block succeeds, update the chain based on the first performance value so that the chain is available to one or more of the plurality of processing devices on the communication network; and
    a second processing device coupled to a second AI chip, the second processing device contains programming instructions that, when executed, will cause the second processing device to:
    receive the chain from the communication network, the chain comprising the performance measure;
    receive from the communication network the block and the verification request;
    respond to the verification request from the first processing device by:
        loading the AI model into the second AI chip to generate a second performance value based on the dataset;
        determining whether the second performance value has exceeded the performance measure; and
        if the second performance value has exceeded the performance measure, responding to the verification request via the communication network with a verification success.

2. The system of claim 1, wherein the AI model is a convolutional neural network comprising a plurality of weights for loading into the first and second AI chips.

3. The system of claim 1, wherein programming instructions for verifying the block comprise programming instructions that, when executed, will cause a processing device on the communication network to: (vii) receive responses from the second processing device or one or more additional processing devices responding to the verification request; and
    (viii) based on the received responses, determine that the verification of the block is successful if at least a percentage of the total number of processing devices receiving the verification request has responded with a verification success.

4. The system of claim 3, wherein programming instructions for verifying the block also contain programming instructions that will:
    repeat steps (vii)-(viii) within a time period; and
    determine that the verification of the block fails if not more than the percentage of the total number of processing devices receiving the verification request has responded with a verification success within the time period.

5. The system of claim 1, wherein programming instructions for receiving the chain that comprises the performance measure are configured to cause the second processing device to receive the performance measure at a time interval.

6. The system of claim 1, wherein the first processing device comprises additional programming instructions configured to cause the first processing device to:
    if verification of the block is successful, receive an award if no chain that comprises a performance value that is better than the first performance value is received on the communication network within a time period.

7. The system of claim 1, wherein programming instructions for generating the AI model comprise additional programming instructions configured to cause the first processing device to convert a floating model to a fixed point model.

8. The system of claim 1, wherein programming instructions for generating the AI model comprise programming instructions configured to cause the first processing device to:
(i) initialize the AI model;
(ii) determine a string;
(iii) use a hash encoder to generate a hash code based on the string;
(iv) fill in the AI model with the hash code;
(v) determine whether the AI model has been filled up;
(vi) if the AI model has not been filled up:
update the string with the hash code;
use the hash encoder to generate the hash code based on the updated string; and
repeat steps (iv)-(vi) until the AI model has been filled up.

9. The system of claim 8, wherein the hash encoder is one of a SHA1, SHA224, SHA256, SHA384, or SHA512 methods.

10. The system of claim 8, wherein the string comprises a unique random string.

11. A method comprising:
by a first processing device:
(i) accessing a dataset;
(ii) generating an artificial intelligence (AI) model;
(iii) loading the AI model into a first AI chip to generate a first performance value based on the dataset;
(iv) receiving a chain from a communication network, the chain comprising a performance measure;
(v) determining whether the first performance value has exceeded the performance measure; and
(vi) if the first performance value has exceeded the performance measure:
creating a block comprising the AI model and the first performance value;
transmitting the block and a verification request to the communication network to verify the block; and
if verification of the block succeeds, updating the chain based on the first performance value so that the chain is available to one or more of the plurality of processing devices on the communication network; and
by a second processing device:
receiving from the communication network the chain comprising the performance measure;
receiving from the communication network the block and the verification request;
responding to the verification request from the first processing device by:
loading the AI model into a second AI chip to generate a second performance value based on the dataset;
determining whether the second performance value has exceeded the performance measure; and
if the second performance value has exceeded the performance measure, responding to the verification request via the communication network with a verification success.

12. The method of claim 11, wherein the AI model is a convolutional neural network comprising a plurality of weights for loading into the first and second AI chips.

13. The method of claim 11, wherein verifying the block comprises: (vii) receiving responses from the second processing device or one or more additional processing devices responding to the verification request; and
(viii) based on the received responses, determining that the verification of the block is successful if at least a percentage of the total number of processing devices receiving the verification request has responded with a verification success.

14. The method of claim 13, wherein verifying the block additionally comprises:
repeating steps (vii)-(viii) within a time period; and
determining that the verification of the block fails if not more than the percentage of the total number of processing devices receiving the verification request has responded with a verification success within the time period.

15. The method of claim 11, wherein receiving the chain that comprises the performance measure occurs at a time interval.

16. The method of claim 11 further comprising, by the first processing device:
if verification of the block is successful, receiving an award if no chain that comprises a performance value that is better than the first performance value is received on the communication network within a time period.

17. The method of claim 11, wherein generating the AI model comprises converting a floating model to a fixed point model.

18. The method of claim 11, wherein generating the AI model comprises:
(i) initializing the AI model;
(ii) determining a string;
(iii) using a hash encoder to generate a hash code based on the string;
(iv) filling in the AI model with the hash code;
(v) determining whether the AI model has been filled up;
(vi) if the AI model has not been filled up:
updating the string with the hash code;
using the hash encoder to generate the hash code based on the updated string; and
repeating steps (iv)-(vi) until the AI model has been filled up.

19. The method of claim 18, wherein the hash encoder is one of a SHA1, SHA224, SHA256, SHA384, or SHA512 methods.

20. The method of claim 18, wherein the string comprises a unique random string.

* * * * *